(12) United States Patent
Jarabek

(10) Patent No.: US 8,213,974 B2
(45) Date of Patent: Jul. 3, 2012

(54) SYSTEM AND METHOD FOR SEQUENCING RADIO ITEMS FOR A MULTI DOWNLINK MULTI CARRIER RECEIVER

(75) Inventor: Michael Joseph Jarabek, Waterloo (CA)

(73) Assignee: Research In Motion Limited, Waterloo (CA)

( * ) Notice: Subject to any disclaimer, the term of this patent is extended or adjusted under 35 U.S.C. 154(b) by 337 days.

(21) Appl. No.: 12/551,711

(22) Filed: Sep. 1, 2009

(65) Prior Publication Data

US 2011/0053519 A1 Mar. 3, 2011

(51) Int. Cl.
*H04B 7/00* (2006.01)
(52) U.S. Cl. .................. 455/512; 455/552.1; 455/553.1; 455/78; 370/252; 370/319; 370/329; 370/337; 370/342; 710/22; 718/102
(58) Field of Classification Search ............... 455/552.1, 455/553.1, 512, 78; 370/252, 319, 329, 337, 370/342; 710/22; 718/102
See application file for complete search history.

(56) References Cited

U.S. PATENT DOCUMENTS

| | | | | |
|---|---|---|---|---|
| 5,754,542 | A * | 5/1998 | Ault et al. | 370/342 |
| 7,778,226 | B2 * | 8/2010 | Rayzman et al. | 370/337 |
| 2002/0191557 | A1 * | 12/2002 | Chow et al. | 370/329 |
| 2003/0149809 | A1 * | 8/2003 | Jensen et al. | 710/22 |
| 2004/0054998 | A1 * | 3/2004 | Hayashi | 718/102 |
| 2006/0262741 | A1 * | 11/2006 | Niemela | 370/319 |
| 2007/0238483 | A1 * | 10/2007 | Boireau et al. | 455/553.1 |
| 2008/0161041 | A1 * | 7/2008 | Pernu | 455/553.1 |
| 2009/0040937 | A1 * | 2/2009 | Xhafa et al. | 370/252 |

FOREIGN PATENT DOCUMENTS

| WO | WO 2007/112761 A1 | 10/2007 |
|---|---|---|
| WO | WO 2007/112762 A1 | 10/2007 |
| WO | WO 2007/116227 A1 | 10/2007 |
| WO | WO 2008/092745 A1 | 8/2008 |
| WO | WO 2008/104801 A1 | 9/2008 |
| WO | WO 2008/117185 A2 | 10/2008 |

OTHER PUBLICATIONS

Costa, Elena; Search Report from corresponding European Application No. 09169138.6; search completed Mar. 22, 2010.

* cited by examiner

*Primary Examiner* — April G Gonzales
(74) *Attorney, Agent, or Firm* — Wilfred So; Brett J. Slaney; Blake, Cassels & Graydon LLP

(57) ABSTRACT

A system and method are provided for sequencing radio events in a mobile device with a multi downlink multi carrier receiver. In the mobile device, there is a processor in communication with a timing control unit (TCU), whereby the TCU is in communication with two or more radios. The processor collects one or more radio events corresponding to the two or more radios and then sorts the radio events from highest priority to lowest priority to form a sorted list. The processor then loads the sorted list, beginning with a highest priority radio event, onto the TCU.

22 Claims, 17 Drawing Sheets

SYSTEM AND METHOD FOR SEQUENCING RADIO ITEMS FOR A MULTI DOWNLINK MULTI CARRIER RECEIVER

TECHNICAL FIELD

The following relates to systems and methods for sequencing radio items for a multi downlink multi carrier receiver.

BACKGROUND

Data transmission rates for mobile devices have increased in part due to the development of networks. One such development is the Enhanced Data Rates for GSM Evolution (EDGE), also known as Enhanced GPRS (EGPRS). It is a backward-compatible digital mobile phone technology that allows for improved data transmission rates as an extension on top of standard Global System for Mobile communications (GSM).

As another upgrade to both GSM and EDGE, the introduction of EDGE Evolution or Evolved EDGE will further increase data transmission rates. One such feature of Evolved EDGE is the Downlink Dual Carrier (DLDC), which allows a mobile device to receive data on two different frequency channels at the same time, doubling the downlink throughput. A mobile device adapted for Evolved EDGE technology contains at least two radios.

BRIEF DESCRIPTION OF THE DRAWINGS

Embodiments will now be described by way of example only with reference to the appended drawings wherein:

FIG. 15 is a block diagram of a sorted list.

DETAILED DESCRIPTION OF THE DRAWINGS

Figure 1:
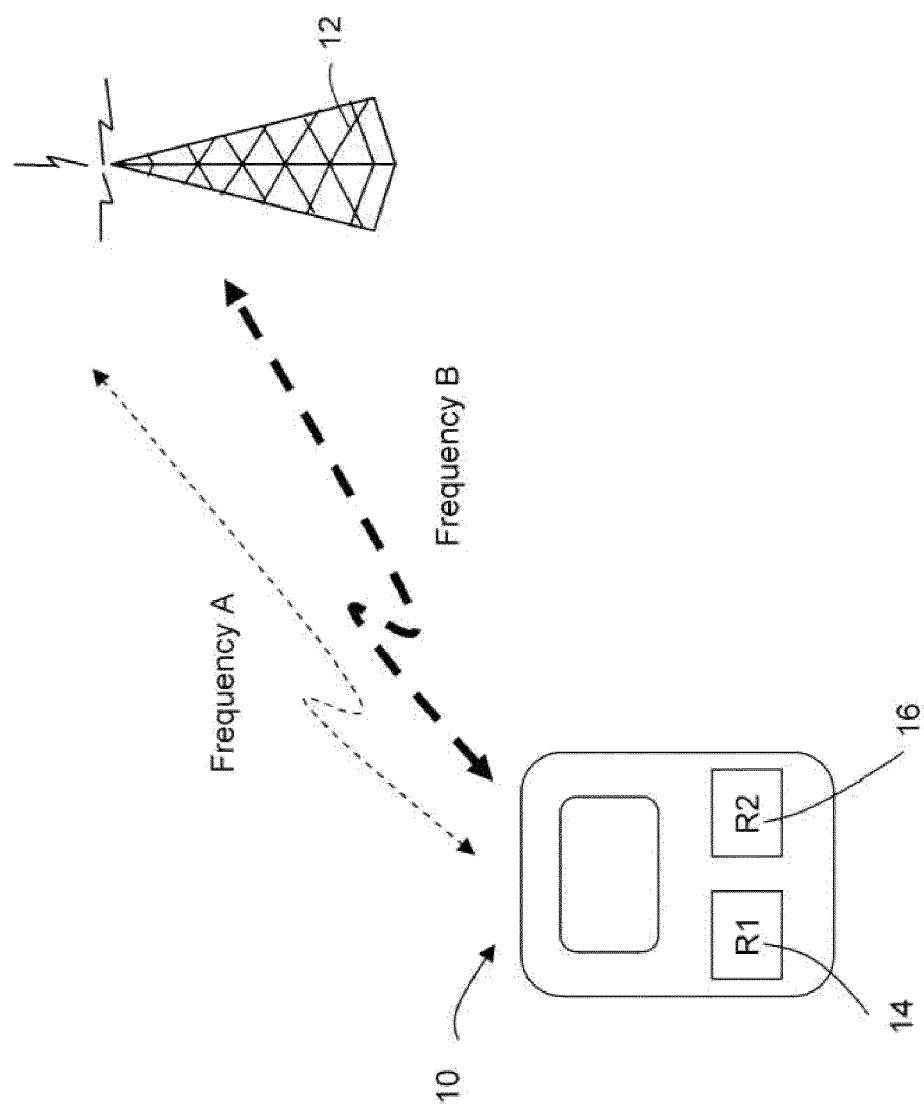
FIG. 1 is a schematic diagram illustrating a mobile device exchanging data on two different frequency channels at the same time.

Turning to FIG. 1, a mobile device 10 is shown communicating with a wireless base station 12. The mobile device 10 is able to exchange data communications with another entity through one or more of such base stations 12. The exchange of wireless data is illustrated by the dotted lines.

The mobile device 10 contains two radio devices 14 and 16 (also denoted by 'R1' and 'R2' respectively). In one configuration, each radio device 14, 16 comprises a receiver. This allows the mobile device 10 to simultaneously receive data at different frequencies. It can be appreciated that at least one of the radio devices 14, 16 comprises a transmitter so that the mobile device 10 can transmit data. In other embodiments, each of the radio devices 14, 16 contain both a receiver and transmitter, or a transceiver. In this way, it can be appreciated that the mobile device 10 can transmit, as well as receive simultaneously at different frequencies.

In other mobile devices 10 where there is a single radio, a number of radio events for the single radio are streamed to a timing control unit (TCU). As will be discussed in further detail below, the TCU processes the single stream of radio events in order to activate the single radio. The TCU also controls the timing of the transmission and reception of signals for the mobile device 10. However, where a mobile device 10 has two or more radios 14 and 16, there will be two or more channels with twice the amount of data being received. Thus, a system and method is required to manage and process the two channels of data from each of the radios 14, 16. Therefore, a system comprising two or more radios 14, 16 connected to at least one TCU is provided. The radio events for each of the radios are collected and sequenced before they are streamed to the TCU. This allows the TCU, which handles only a single channel or stream of events, to control the timing of two or more separate radios.

Figure 2:
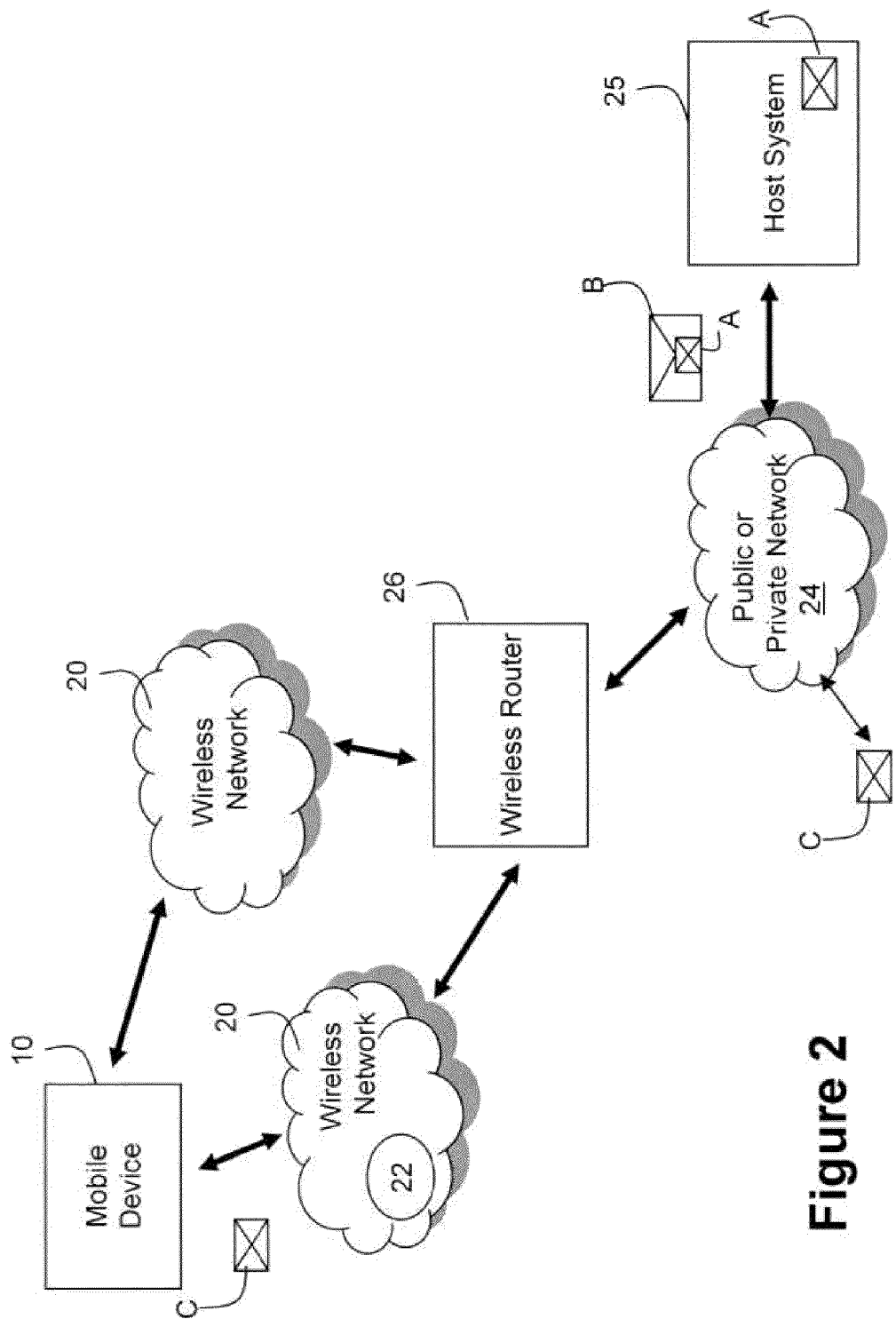
FIG. 2 is a schematic diagram illustrating a system in which data items are pushed from a host system to a mobile device.

It can be appreciated that a mobile device 10 that can communicate simultaneously over different frequencies normally does so through a wireless network 20, an example of which is shown in FIG. 2.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system 25 to the mobile device 10. One example of such a system will now be described making reference to FIG. 2.

FIG. 2 is an example system diagram showing the redirection of user data items (such as message A or C) from a corporate enterprise computer system (host system) 25 to the user's mobile device 10 via a wireless router 26. The wireless router 26 provides the wireless connectivity functionality as it acts to both abstract most of the wireless network's 20 complexities, and it also implements features necessary to support pushing data to the mobile device 10. Although not shown, a plurality of mobile devices may access data from the host system 25. In this example, message A in FIG. 2 represents an internal message sent from, e.g. a desktop computer (not shown) within the host system 25, to any number of server computers in the corporate network (e.g. LAN), which may, in general, include a database server, a calendar server, an E-mail server or a voice-mail server.

Message C in FIG. 2 represents an external message from a sender that is not directly connected to the host system 25, such as the user's mobile device 10, some other user's mobile device (not shown), or any user connected to the public or private network 24 (e.g. the Internet). Message C could be e-mail, voice-mail, calendar information, database updates, web-page updates or could even represent a command message from the user's mobile device 10 to the host system 25. The host system 25 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 10 may be adapted for communication within wireless network 20 via wireless links, as required by each wireless network 20 being used. As an illustrative example of the operation for a wireless router 26 shown in FIG. 2, consider a data item A, repackaged in outer envelope B (the packaged data item A now referred to as "data item (A)") and sent to the mobile device 10 from an Application Service Provider (ASP) in the host system 25. Within the ASP is a computer program, similar to a wireless mobility agent, running on any computer in the ASP's environment that is sending requested data items from a data store to a mobile device 10. The mobile-destined data item (A) is routed through the network 24, and through the wireless router's 26 firewall protecting the wireless router 26 (not shown).

Although the above describes the host system 25 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26 (sometimes referred to as a "relay", "message servers" "data redirector", etc.), there are a number of major advantages to both the host system 25 and the wireless network 20. The host system 25 in general runs a host service that is considered to be any computer program that is running on one or more computer systems. The host service is said to be running on a host system 25, and one host system 25 can support any number of host services. A host service may or may not be aware of the fact that information is being channelled to mobile devices 10. For example an e-mail or message program 138 (see FIG. 3) might be receiving and processing e-mail while an associated program (e.g. an e-mail wireless mobility agent) is also monitoring the mailbox for the user and forwarding or pushing the same e-mail to a wireless device 10. A host service might also be modified to prepared and exchange information with mobile devices 10 via the wireless router 26, like customer relationship management software. In a third example, there might be a common access to a range of host services. For example a mobility agent might offer a Wireless Access Protocol (WAP) connection to several databases.

Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 10 and wireless network 20, offer push services to standard web-based server systems and allow a host service in a host system 25 to reach the mobile device 10 in many countries.

The host system 25 shown herein can have many methods when establishing a communication link to the wireless router 26. For one skilled in the art of data communications the host system 25 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 25 that might employ the wireless router 26 to perform push could include: field service applications, e-mail services, stock quote services, banking services, stock trading services, field sales applications, advertising messages and many others. This wireless network 20 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 25, or that the host system 25 acquires through the use of intelligent agents, such as data that is received after the host system 25 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, Evolved EDGE or EDGE Evolution, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 25, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 10 traffic can be addressed to a host system 25 without the need for the wireless network 20 to assign an identity to each host system 25; 2) An efficient and authenticated method for the host system 25 to initiate a communication connection to the wireless router 26 for the purposes of opening a communication tunnel to the one or more mobile devices 10 that the host system 25 wishes to communicate with; 3) A reliable method for exchanging data between the host system 25 and the mobile device 10, in a manner consistent with the abilities of the wireless network 20; 4) Providing feedback to the host system 25 when data is delivered, which allows the host system to clean up any wireless delivery queues if necessary, or inform the original sender (user or program) that the data has been delivered to the mobile device 10; 5) Implementation of a wireless network 20 initiated push of services or data to a mobile device 10, from a wireless router 26; and 6) Connect to a wide range of wireless networks 20 and provide a way of tracking the user's location so that a 'follow you anywhere' solution can be provided.

Figure 3:
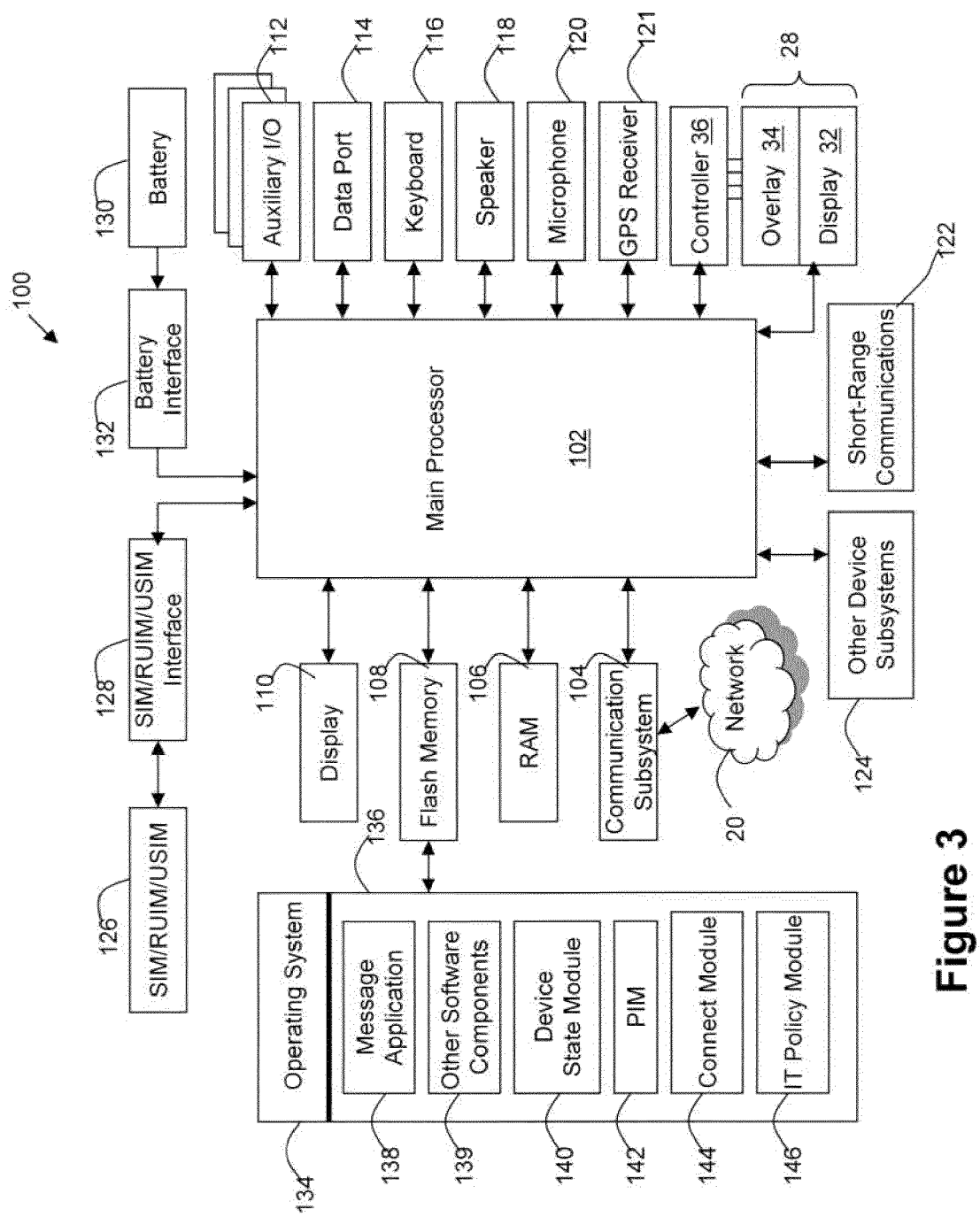
FIG. 3 is a block diagram of an exemplary embodiment of a mobile device.
Figure 4:
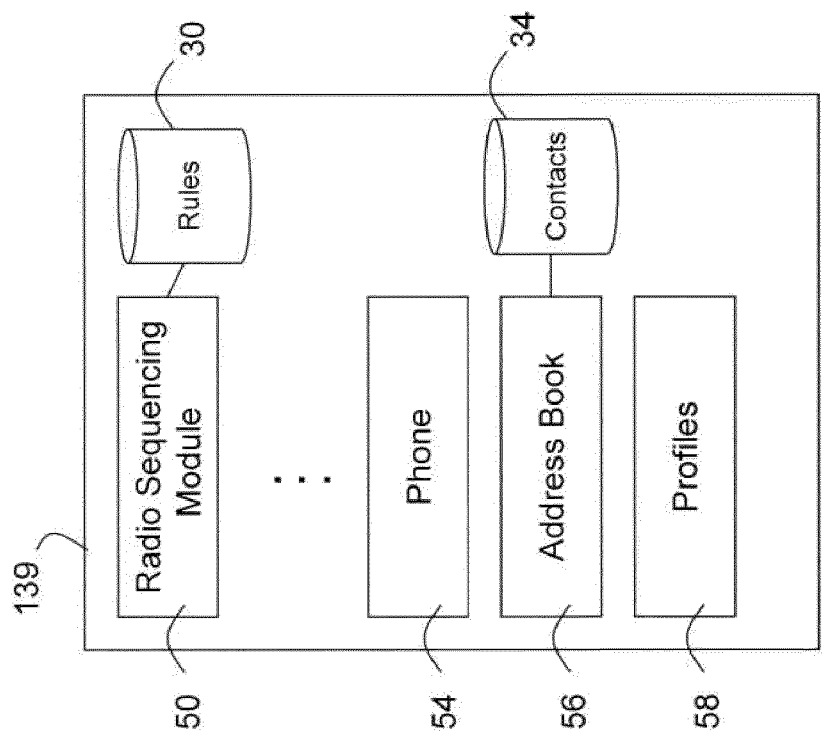
FIG. 4 is a block diagram illustrating exemplary ones of the other software applications and components shown in FIG. 3.

An exemplary configuration for the mobile device 10 is illustrated in FIGS. 3-4. Referring first to FIG. 3, shown therein is a block diagram of an exemplary embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives data from and sends data to a wireless network 20. In this exemplary embodiment of the mobile device 10, the communication subsystem 104 is configured in accordance with the GSM and GPRS standards, which are used worldwide. Other communication configurations that are equally applicable are the 3G and 4G networks, for example Evolved EDGE or EDGE Evolution, as discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 116 can also be used to provide additional information such as the identity of a calling party, duration of a voice call, or other voice call related information.

For composing data items, such as e-mail messages, for example, a user or subscriber could use a the touch-sensitive overlay 34 on the display 32 that are part of the touch screen display 28, in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 4 shows an example of the other software applications and components 139 that may be stored on and used with the mobile device 10. Only examples are shown in FIG. 4 and such examples are not to be considered exhaustive. In this example, a radio event sequencing module 50, phone application 54, address book 56 and a profiles application 58 are shown to illustrate the various features that may be provided by the mobile device 10. It will be appreciated that the various applications may operate independently or may utilize features of other applications. For example, the phone application 54 and email application 138 may use the address book 56 for contact details obtained from a list of contacts 34.

The radio sequencing module 50 provides the functionality required in this example for the mobile device 10 to sequence the events from two or more radios as will be explained in greater detail below. The radio sequencing module 50 sequences the radio events by sorting or optimising, or both, according to a number of conditions and rules 30. In one embodiment, this software module operates at Layer 1 (the physical layer according to the Open Systems Interconnection model for networking) of the mobile device 10.

Figure 5:
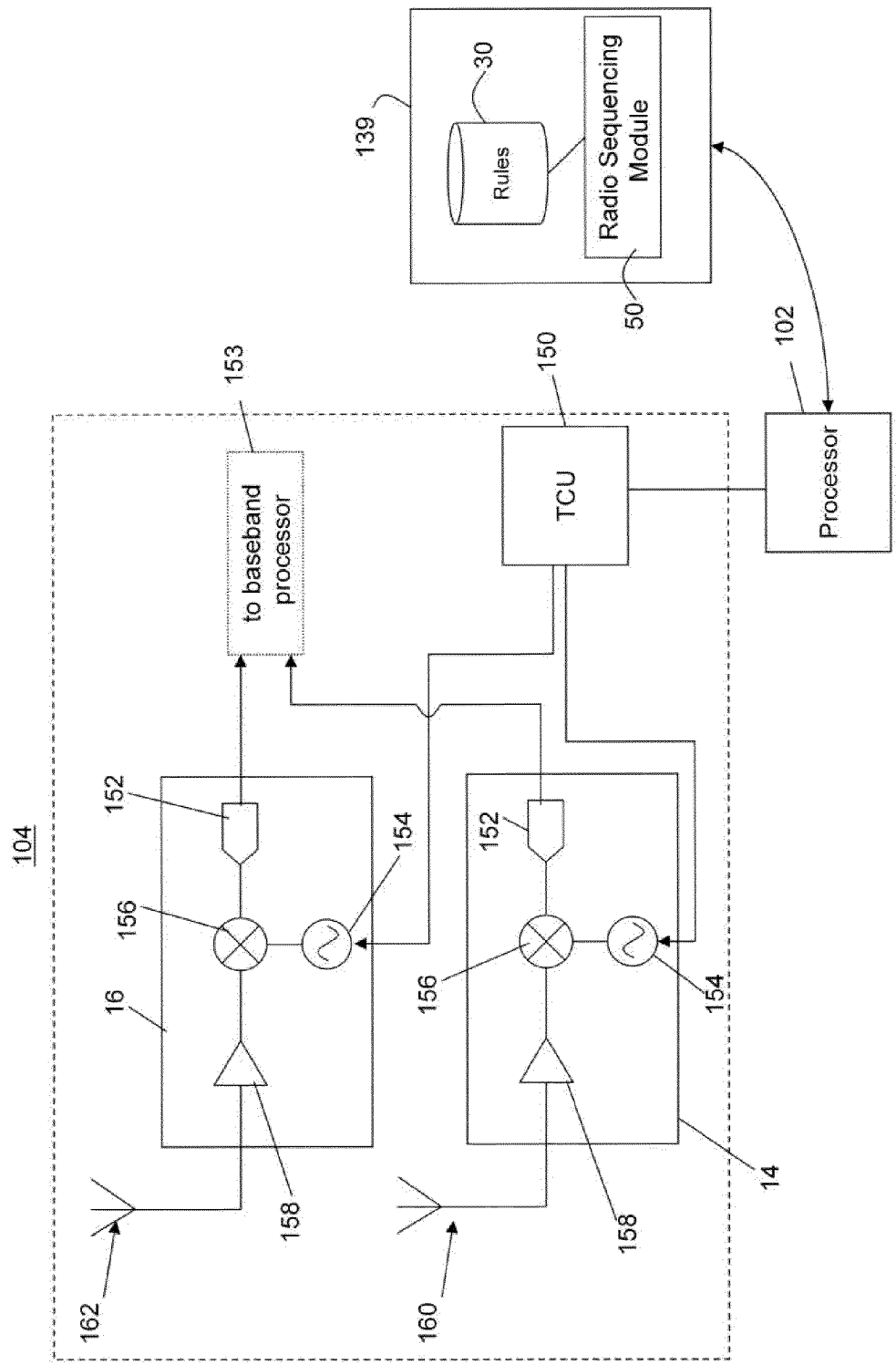
FIG. 5 is a schematic diagram of one example configuration for the communication subsystem shown in FIG. 3 with two radios.

Turning to FIG. 5, an example configuration of the communication subsystem 104 in communication with the processor 102 is shown. The radio sequencing module 50 is in communication with the processor 102, and the processor 102 is connected to the TCU 150. The radio sequencing module 50 and the processor 102 provide a sequence of radio events, for example, in the form of TCU instructions, to the TCU 150 for execution. As discussed above, the TCU 150 implements at least one stream of events that may contain relative delays therebetween. In some embodiments, the TCU 150 executes only a single stream of radio events. The TCU 150 drives two separate radios 14, 16. Although not shown, it can be appreciated that the TCU 150 may drive more than two radios. The radios 14, 16 shown in FIG. 5 show components of a receiver. Although not shown, and as discussed above, at least one of the radios 14, 16 also includes components for a transmitter. Each of the radios 14, 16 comprises an oscillator 154, mixer 156, amplifier 158 and analog to digital converter 154. It can be appreciated that in a receiver, the amplifier 158 is commonly referred to as a low noise amplifier, while in a transmitter the amplifier 158 is commonly referred to as a power amplifier. The oscillator 154, also often referred to as a frequency synthesizer, is started and stopped by control signals from the TCU 150. The signals from oscillator 154 are then mixed with those signals received from the network 20. The signals from the network 20 are received through the antennas 160, 162 corresponding to each radio 14, 16, respectively. Each antenna is connected to an amplifier 158, so that the signal from the network can be amplified. As can be seen, the analog output from the mixer 156 is converted to a digital signal through the analog to digital converter 154, whereby the digital signals are sent back to a baseband processor 153. It can be appreciated that the baseband processor 153 contains instructions to demodulate and recover the data carried by the wireless network, as typically used in modern technology. The baseband processor 153 may form part of the main processor 102, or it can be a separate processor. Other radio configurations may include filters. It can be appreciated that any radio configuration suitable for receiving wireless data is applicable to the principles described herein.

Although not shown, the components of a transmitter are similar to a receiver. The digital signals from a baseband processor 153 are sent to a digital to analog converter. The analog signals outputted from the digital to analog converter are mixed with signals outputted from an oscillator. The mixed analog signal is sent to a power amplifier, which is transmitted through a connected antenna. Similarly, the oscillator in the transmitter is controlled by the TCU 150. As discussed above, it is possible that a radio may comprise a transmitter and a receiver, or a transceiver, and thus, certain components may be used for both the transmitting and receiving functions.

Figure 6:
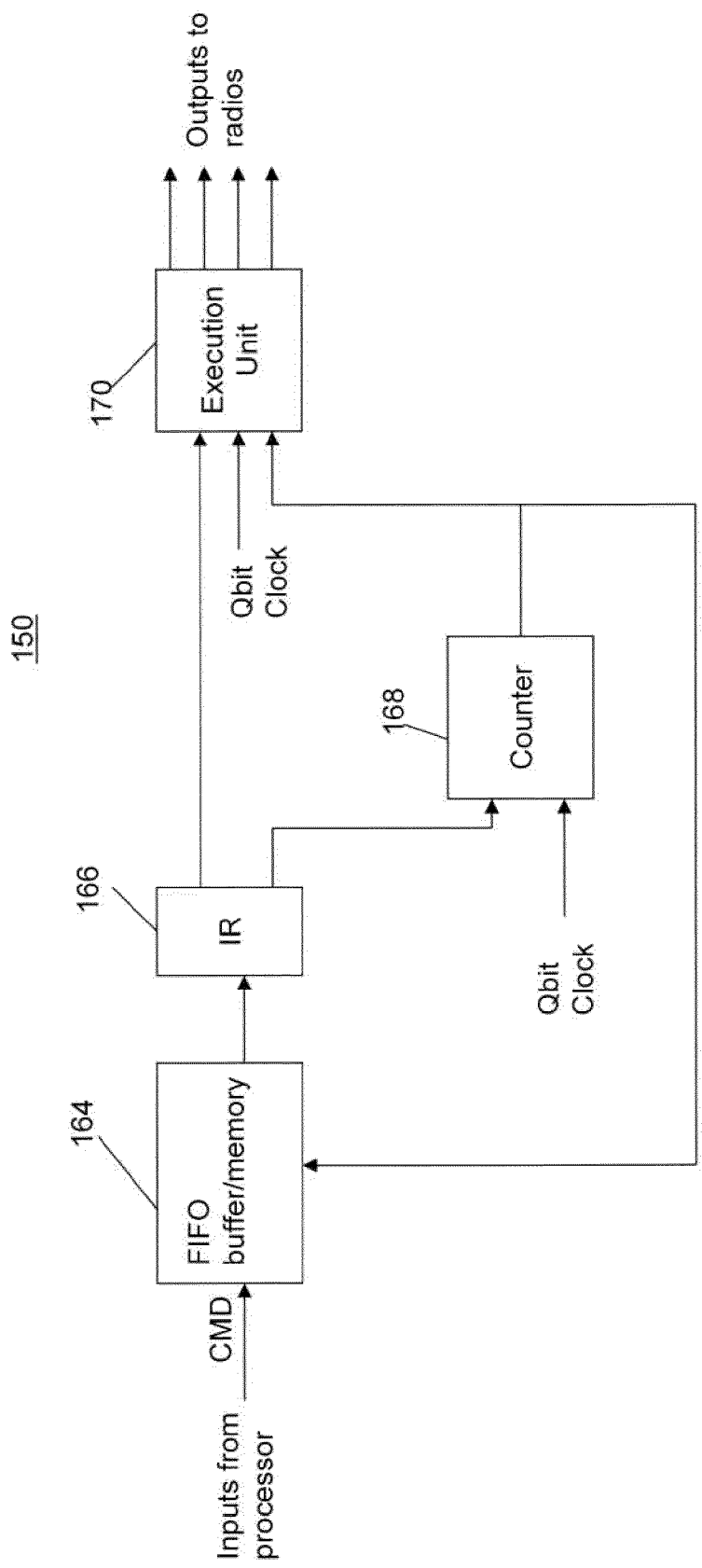
FIG. 6 is a schematic diagram of the timing control unit shown in FIG. 5.

Turning to FIG. 6, further details of a configuration for the TCU 150 is provided. The TCU 150 times and sequences the functions of the software, for example at Layer 1. As shown in FIG. 5, the TCU 150 acts as an interface to between the processor 102 and the radios 14, 16. Thus, the TCU 150 processes higher level instructions from the processor 102 to build a schedule of instructions for affecting the GSM timing and control at Layer 1. In the embodiment shown, the TCU 150 comprises a first-in-first-out (FIFO) buffer 164, which receives instructions or events from the processor 102. The FIFO buffer 164 sends the instructions or events to the instruction register 166. The instruction register 164 is a buffer that holds a copy of the instructions, which are to be executed at a certain time based on the counter 168. The instructions or events are sent to the execution unit 170 based on the timing of the counter 168. For example, when the instruction or event that is currently first in the FIFO buffer 164 is about to be executed, if the delay value is non-zero, then the instruction or event is loaded into the counter 168. When the counter 168 counts down to zero, the instruction or event is executed by the execution unit 170. Based on the instruction or event, the execution unit 170 then sends a command to one or more radios 14, 16, or in particular the oscillators 154 in the radios, to generate a waveform or signal. The TCU 150 executes several types of instructions. For example, these types of instructions include set and clear general purpose outputs, schedule interrupts to various processors in the system, and control clock calibration.

Given that the TCU 150 executes events in a serial nature, and that instructions or events cannot be easily inserted into the FIFO buffer 164 in a random fashion, a method is provided for gathering a list of radio events or TCU instructions. These radio events or instructions are then sorted in an increasing chronological order and stored as a sorted queue or list before being transmitted to the FIFO buffer 164.

Figure 7:
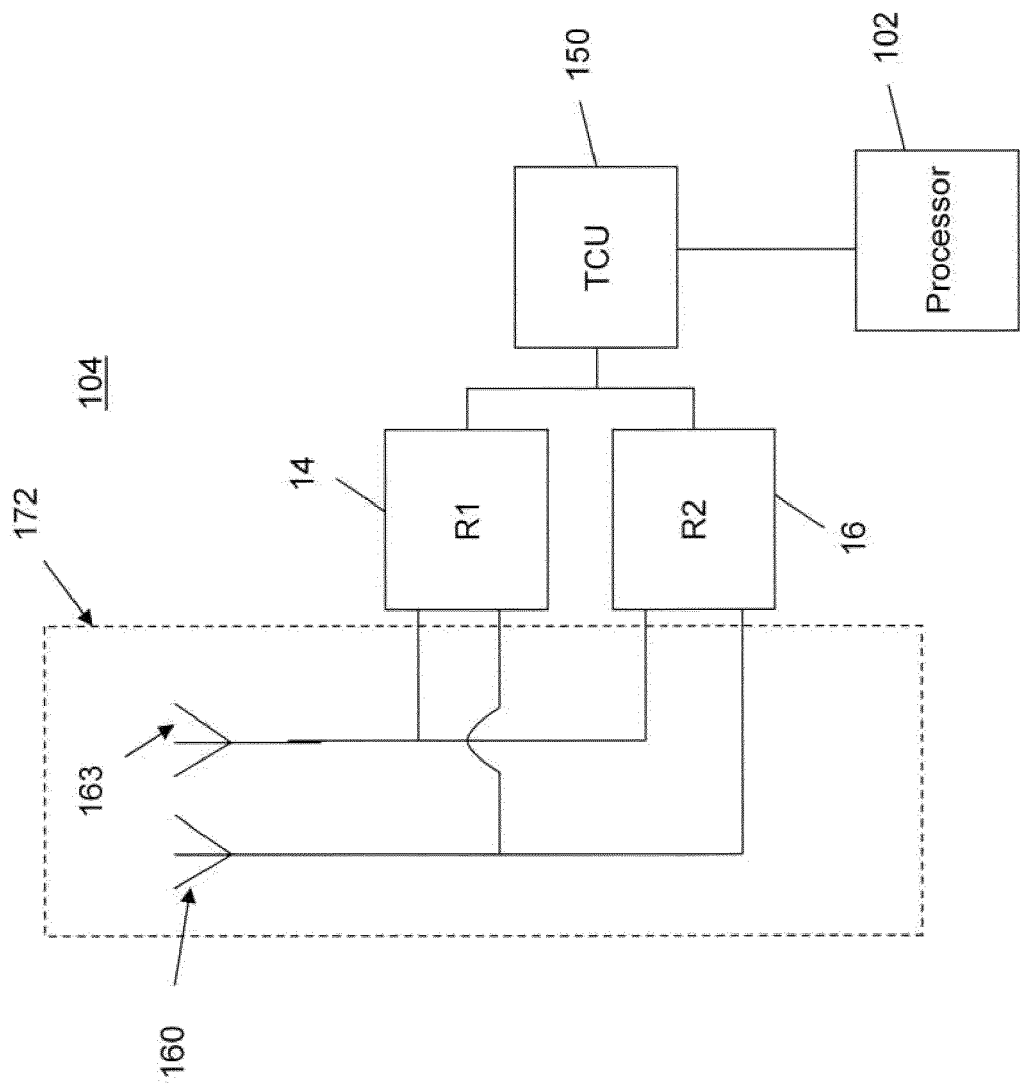
FIG. 7 is a schematic diagram of another embodiment of the communication subsystem shown in FIG. 3.

Turning to FIG. 7, an alternative configuration for the communication subsystem 104 is shown with the antennas 160 and 163. In particular, one radio 14 is connected to both antennas 160, 163, and the other radio 16 is also connected to both antennas 160, 163. The configuration of the hardware (e.g. antennas, radios, amplifiers) is referred to as the front end module 172. The routing and configuration in the front end module 172 can be modified through hardware switches, which can be controlled by software. For example, the front end module 172 may be configured through software commands so that both radios 14 and 16 only receive and transmit using one shared antenna 160. Thus, the electronic hardware components corresponding to the other antenna 163, which are part of the front end module 172, may be powered down to reduce energy consumption. The front end module 172 may have different physical configurations, and its function is to route radio frequency signals from one or more antennas to the radios 14, 16 in the case of receiving data, as well as route the uplink radio frequency from an amplifier 158 to one or more antennas in the case of transmitting data. In a transmitter, the amplifier 158, also commonly referred to as power amplifier, boosts signals from a mixer to the levels needed for transmission to the wireless network 20.

Figure 9:
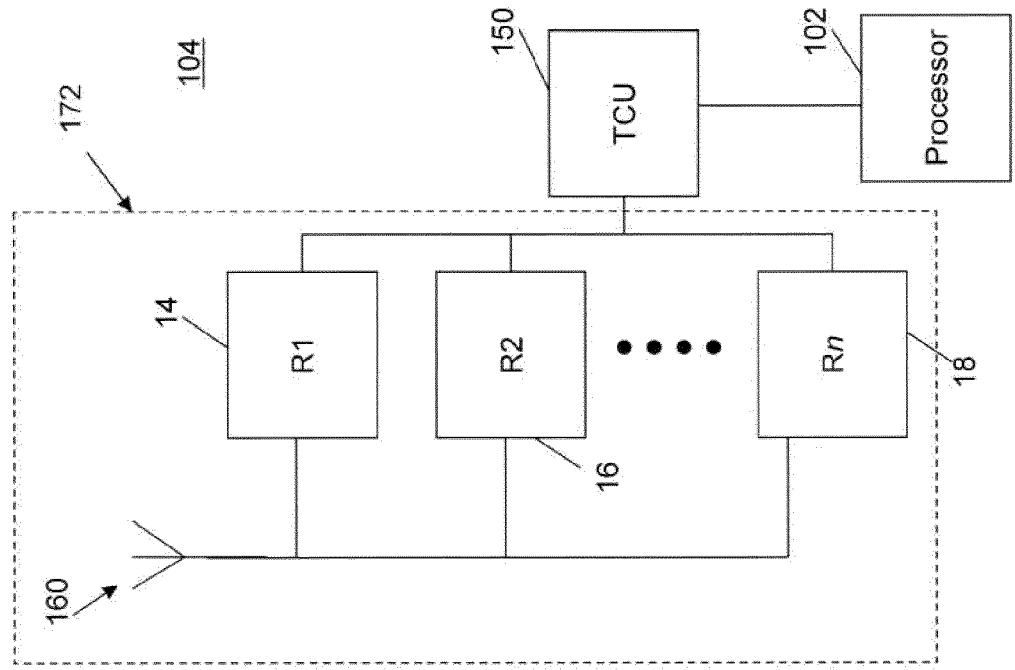
FIG. 9 is a schematic diagram of another embodiment of the communication subsystem shown in FIG. 3.
Figure 8:
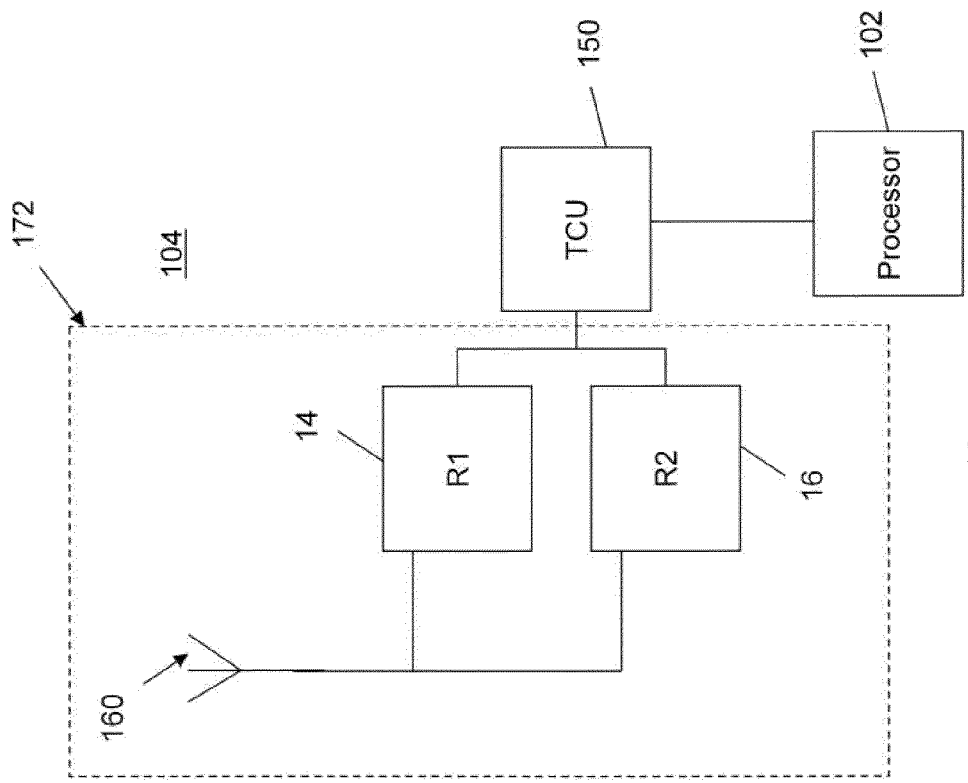
FIG. 8 is a schematic diagram of yet another embodiment of the communication subsystem shown in FIG. 3.
Figure 10:
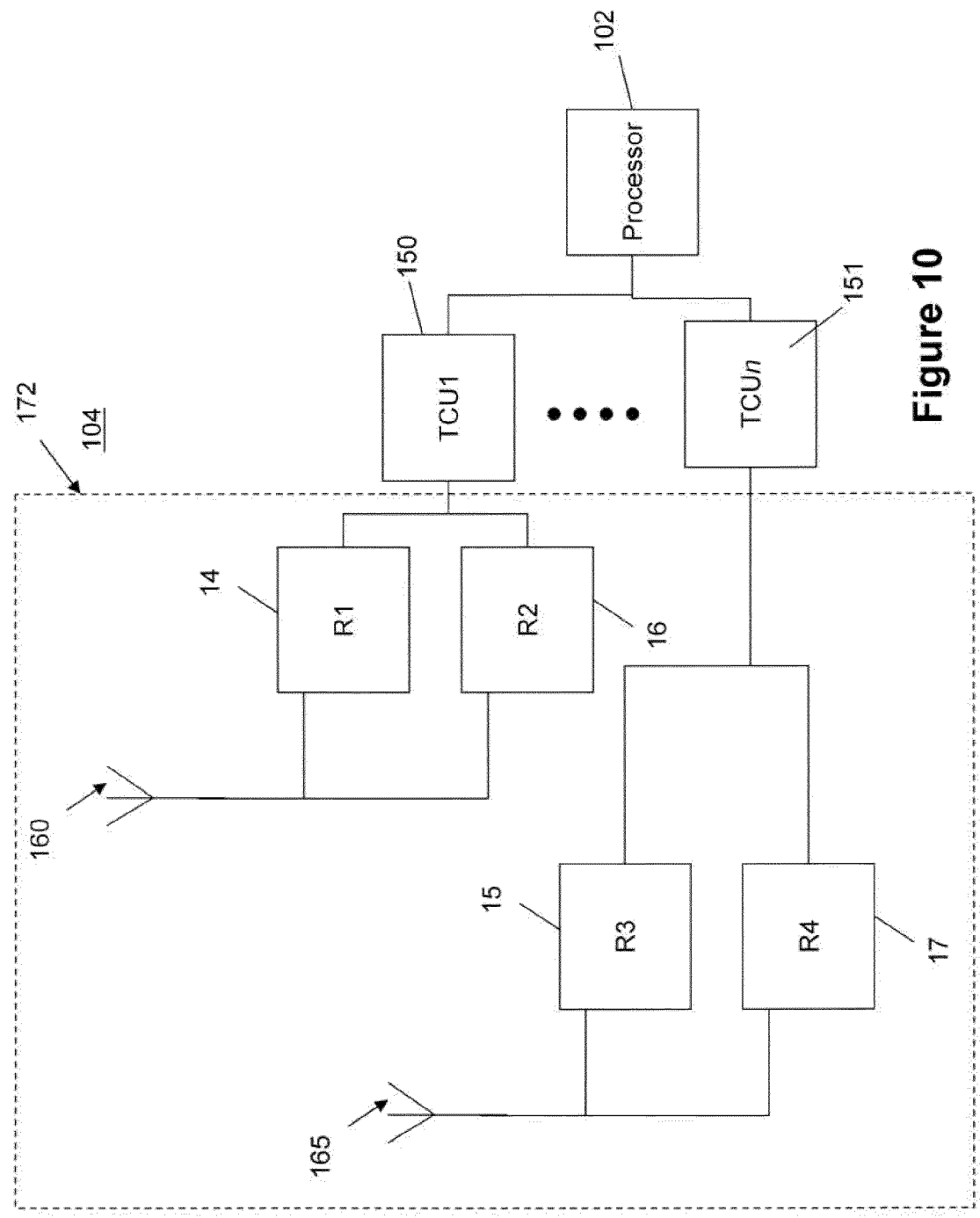
FIG. 10 is a schematic diagram of yet another embodiment of a communication subsystem shown in FIG. 3.

FIGS. 8 to 10 show other embodiments of configurations for the communication subsystem 104. In FIG. 8, two radios 14, 16 are connected to a single antenna 160. In FIG. 9, the TCU 150 is connected to a plurality of radios 14, 16, 18 and each of these radios are connected to a single antenna 160. FIG. 10 show a processor 102 in communication with at least two TCUs 150, 151. Each of these TCUs 150, 151 is connected to a pair of radios 14/16, 15/17. Radios 14 and 16 are connected to one antenna 160, and radios 15 and 17 are connected to another antenna 165. It can thus be appreciated that a number different communication subsystem configurations are applicable to the principles described herein.

Figure 11:
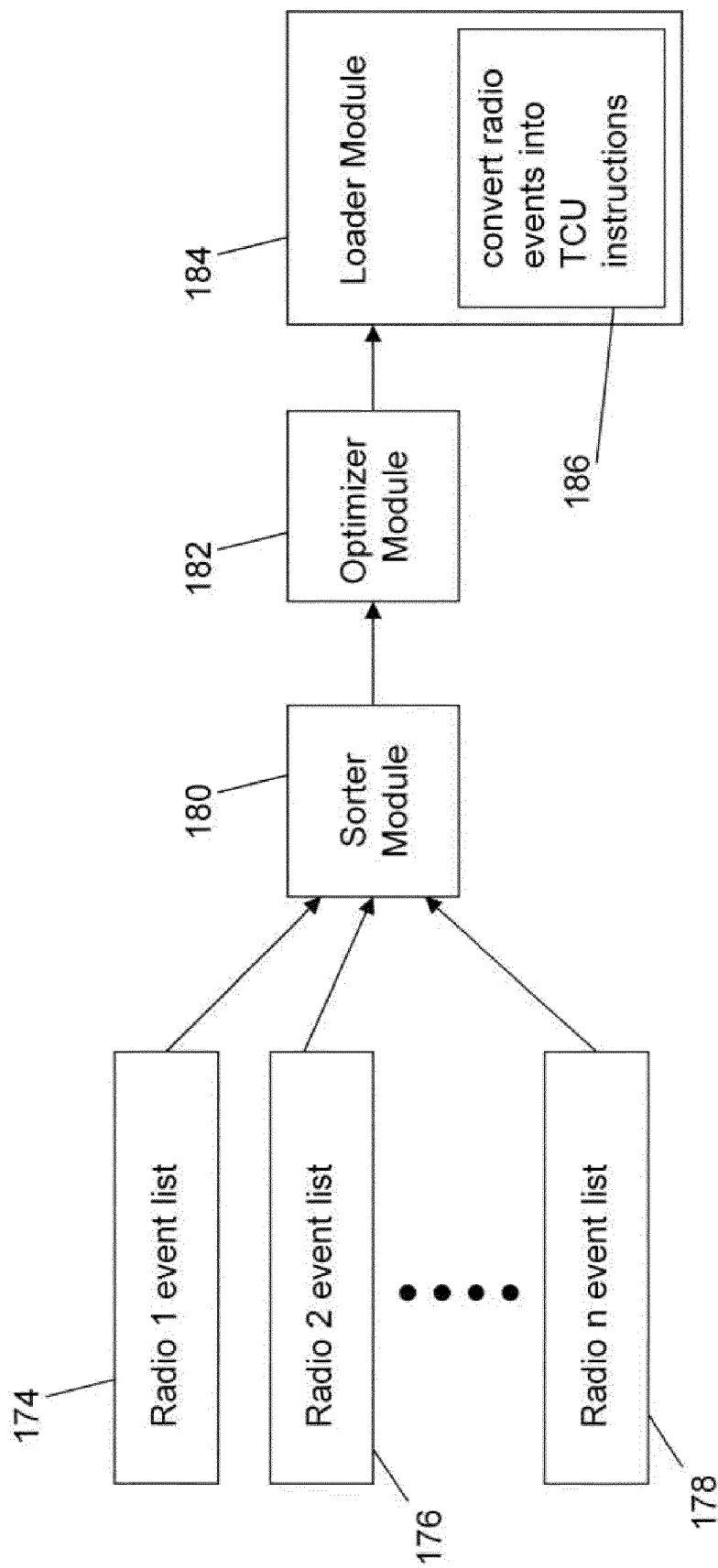
FIG. 11 is a block diagram of the components of the radio sequencing module shown in FIG. 4.

Turning now to FIG. 11, the radio event sequencing module 50 is shown comprising radio event lists 174, 176, 178, a sorter module 180, an optimizer module 182 and a loader module 184. The event lists 174, 176, 178 for each radio are collected and sorted by the sorter module 180. The sorted events are optionally optimized by the optimizer module 182 according to a number of rules 30. The processor 102, through the loader module 184, converts or decomposes the sorted and optimized radio events into TCU instructions as per block 186, and then loads the TCU instructions onto the TCU's FIFO buffer 164. The sequencing process is described in further detail below.

Figure 12:
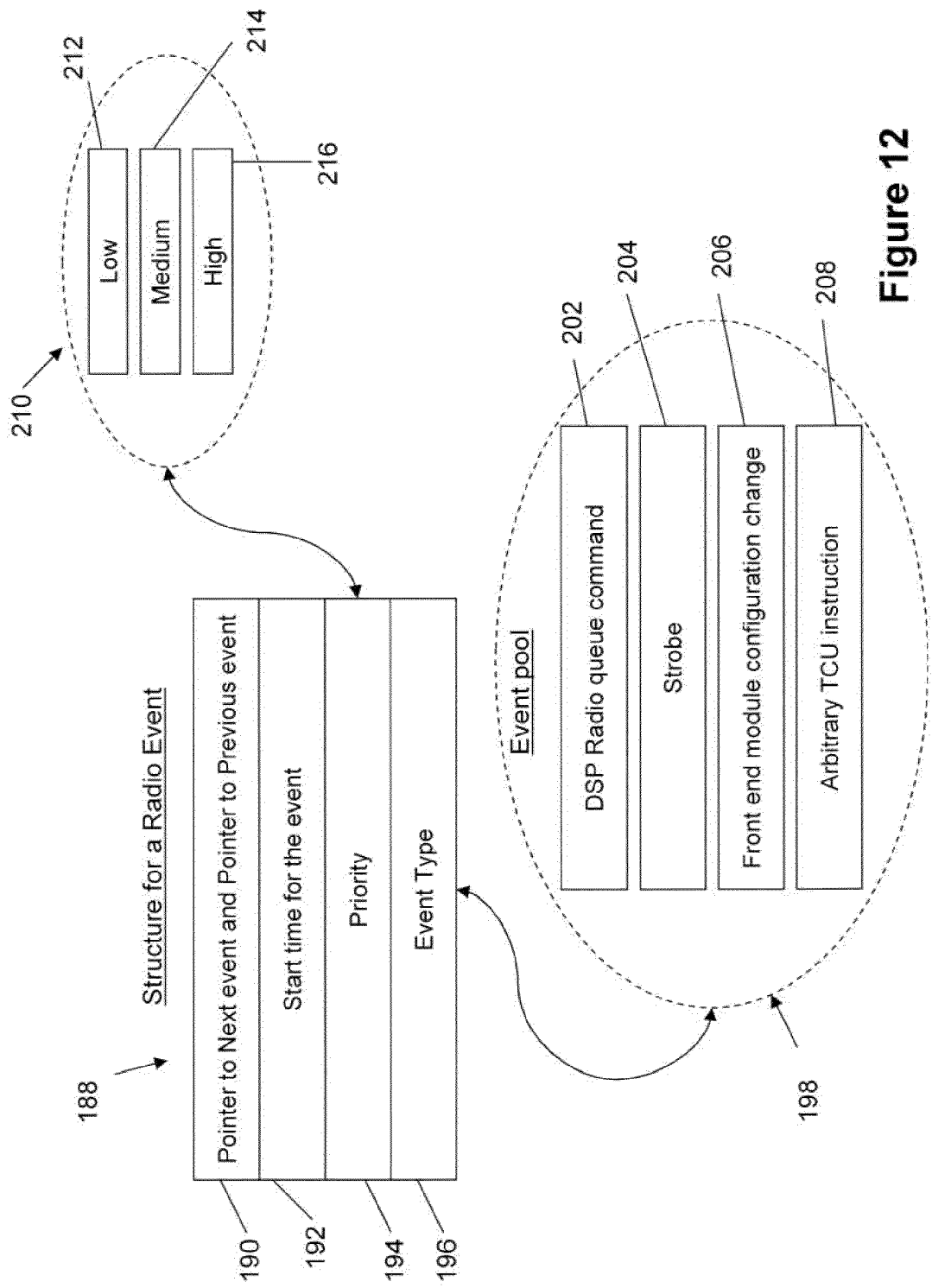
FIG. 12 is a block diagram of the structure of a radio event.

Turning to FIG. 12, a structure 188 for a radio event is shown. The radio events are structured to contain the following information fields: the next and previous pointers 190; the start time for the event 192; the priority 194; and the event type 196. These information fields for a radio event can be placed in various different orders. The next and previous pointers 190 are used to indicate the sequence of certain radio events relative to other radio events and can be used for building chains of timed events. The priority 192 of the event (e.g. low, medium, high) is statically assigned depending on the radio event. For example, one priority scheme 210 includes low 212, medium 214 and high 216 priority levels. In other words, in one embodiment, a mapping between the priority level and the radio event type at the onset is established, so that throughout the mobile device's operation, every instance of a certain event has the same priority level. The radio event types 196 are drawn from an event pool or collection 198. Non-limiting examples of the event types include digital signal processing (DSP) radio queue command 202, strobe 204, front end module configuration change 206, and arbitrary TCU instruction 208.

The radio events are described, or categorized, at a low enough level of detail to be sufficient to control a radio frequency (RF) chipset. It is also preferable that the radio events are described at a high enough level of detail so that a programmer of the driver for the RF chipset does not need to worry about the minute details regarding the timing of events. As noted above, these radio events can be organized into the following groups: synchronous DSP radio queue commands; RF strobes generated on a TCU ouput; front end module configurations on a group of TCU outputs; and arbitrary TCU instructions.

With regards to the synchronous DSP radio queue commands 202, a DSP radio queue contains a circular array of structures that contain commands for one or more digital signal processors to execute. The individual commands in the DSP radio queue can be linked together in a chain to carry out a set of sequential events. It is also appreciated that each of the structures in the radio queue may also include arguments for the commands. Where a radio event is considered a DSP radio queue command, the arguments may include a pointer to the start of the DSP radio queue command chain. Each of the chains in the DSP radio queue can be triggered at a certain time relative to the current frame start time. Examples of typical time measurement units are milliseconds or quarter bits.

With regards to RF strobes 204 generated on a TCU output, the strobes are used to sequence events on the radio device. A burst transmit or receive sequence can be triggered in the radio by a single strobe 204 or a sequence of strobes 204. In one embodiment, more than one TCU command or event is required to execute a strobe 204. In another embodiment, multiple strobes 204 may be generated at the same time to trigger multiple radios. If the event type is considered to be a strobe, then arguments for the strobe command may include the length of time the strobe signal is active, and the polarity of the strobe 204 for indicating the whether the active state of the strobe 204 is high or low.

Radio events regarding front end module configurations 206 include commands that route RF signals from an antenna to the two or more radios, as well as commands that route the uplink RF from the power amplifier 158 to an antenna. In one embodiment, the front end module 172 can be configured so that a radio can be in one of the following states: 1) idle; 2) allowing transmission for a particular frequency band; and 3) allowing reception for a particular frequency band. A radio can be only in one of these states at a given time. In other words, the states are considered mutually exclusive for a radio. For example, an attempt to transmit on one of the radio channels while another radio channel is receiving is considered an error.

The front end module 172 may also be configured by the TCU outputs, or in other words through radio events, so that parts of the front end module circuitry are disabled when not needed. For example, if there were two low noise amplifiers in the front end module 172 (e.g. one for low band frequency and the other for high band frequency), and both radios were receiving on the low band frequency, then some power savings could be achieved by only powering the low band, low noise amplifier. Thus, the high band, low noise amplifier would be powered down. Similar power savings can be achieved where two or more radios are carrying out the same operation, thus allowing the radios to share hardware components and power down inactive components. If the radio event is considered a front end module configuration change, arguments include 1) whether the radio should be switched to idle;

2) if it is not switched to idle, what is the desired frequency band; and 3) if it is not switched to idle, whether the radio is transmitting or receiving.

It can be appreciated that the operation of the front end module 172 depends on the hardware configuration. Variation in and capability of hardware components and configurations of the front end module 172 can be taken into account when establishing the radio commands or events for reconfiguring the front end module 172. The configurations linking the TCU outputs to the front end module configurations can be stored in the mobile device's memory for retrieval.

Other radio events, for example categorized as arbitrary TCU instructions 208, include special instructions to carry out system management functions such as processor sleep mode entry for power savings, and system clock calibrations.

The assignment of priority is dependent on the radio event type. In one priority scheme, a radio event is considered low priority if it is not directly dependent on the networking timing. An example of such an event is a certain type of DSP radio queue command that demodulates a burst, or received radio data. The command to demodulate a received radio command does not have to happen at an exact time. A radio event is considered medium priority if it can be delayed by a few or several clock cycles. An example of such an event is one that controls the power supply to a radio. In particular, the timing at which power is to be supplied to one or more radios during the sleep or idle modes does not have to be exact. A radio event is considered high priority if it should happen first in a given time frame, such as a quarter bit period. An example of such an event is a clock calibration event. Other high priority events may be control signals that activate or deactivate the receivers, as well as signals that activate or deactivate the transmitters. The mapping between a certain event and a priority level is subject to the perceived time urgency of a radio event. Different criteria may be used in addition to, or as an alternative to, those described above, when establishing the mapping. For example, radio events that use a larger number of software and hardware resources may be considered higher priority events compared to those radio events that use a smaller number of resources.

It can be appreciated that the categorization of priority levels is not limited to 'high', 'medium' and 'low'. The priority levels for example can be defined with more or less granularity. For example, the priority scheme can be further defined to have ten levels comprising level one, level two, level three, and so forth, up to level ten. Level one can be designated as the highest priority level while level ten can be designated as the lowest priority level. Similarly, two priority levels, e.g. 'high' and 'low' can be used.

Figure 13:
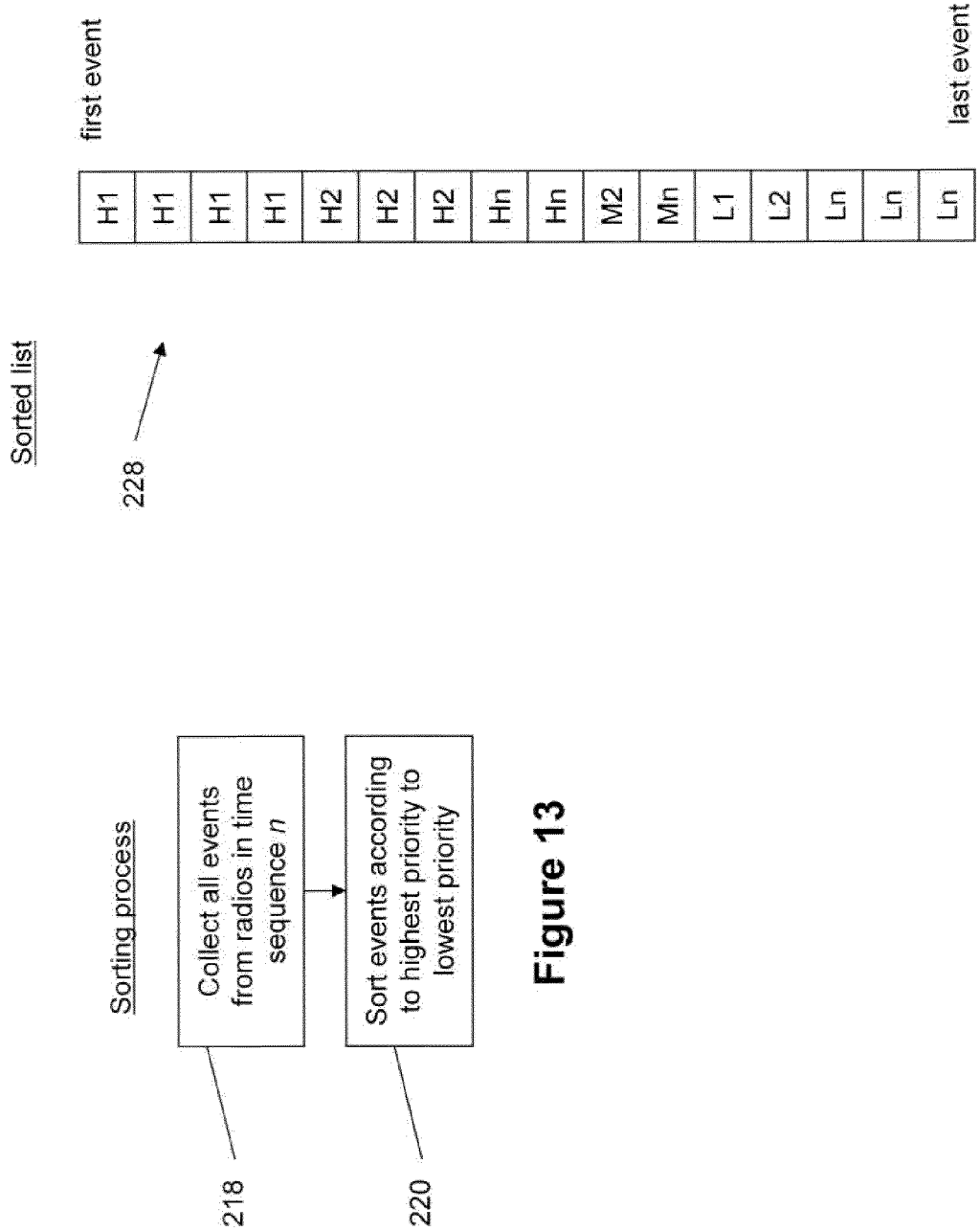
FIG. 13 is a flow diagram of the sorting process carried out by the sorting module in FIG. 11.
Figure 14:
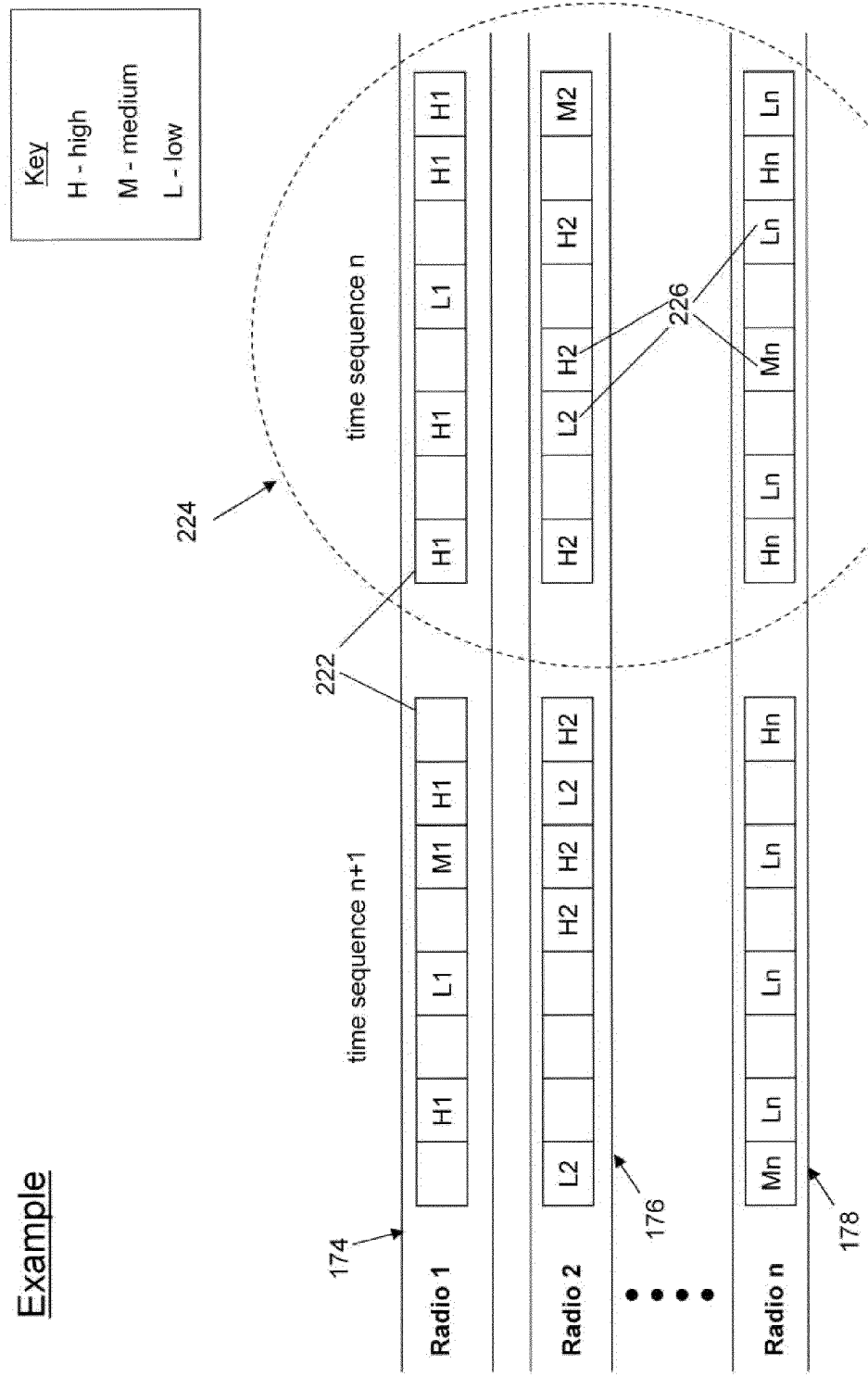
FIG. 14 is a block diagram of an example of the components in the radio event lists shown in FIG. 11.

Returning to FIG. 11, the sorter module 180 collects and sorts the radio events from each event list corresponding to a different radio. An embodiment of the sorting process is shown in FIGS. 13 to 15: FIG. 13 shows the sorting process in which the sorter module 180 collects all the radio events from each of the radios in a given time sequence n, as per step 218. Then, at step 220, the sorter module 180 sorts the events from highest priority to lowest priority.

FIG. 14 shows an example of the unsorted radio event lists 174, 176, 178, wherein each radio event list corresponds to a separate radio in the mobile device 10. For example for a mobile device 10 with two radio devices, there are two lists of radio events. The radio events 226 are grouped into time sequences. A time sequence comprises a sequence or series of time periods 222 according to the network carrier timing. A radio event 226 is scheduled within a time period 222. As shown in FIG. 14, the scheduled radio events 226 are grouped within different time sequences, for example time sequence n and the following time sequence n+1. The most recent time sequence (i.e. time sequence n) can contain a number of radio events 226, each having an assigned priority. In FIGS. 14 and 15, these events are represented by 'H' if it is high priority, 'M' if it is medium priority, and 'L' if it is low priority. The events are also identified as belonging to a radio using the subscript. For example a medium priority event for Radio 1 is represented by $M_1$, and a high priority event for Radio 2 is represented by $H_2$. Similarly, the following time sequence n+1 can also have a number of radio events within each radio's event list. The events may or may not be in any particular order within each time sequence.

Upon the sorter module 180 receiving or collecting the radio events from each radio, the sorter module 180 collectively looks at all the events from all the radios within a given time sequence. In other words, in FIG. 14, the sorter module 180 considers or examines all the events in time sequence n, as indicated by the grouping 224. Based on the priority level of each event, the sorter module 180 organizes the events from highest priority to lowest priority, as per step 220. Turning to FIG. 15, the sorting results in a sorted list 228 whereby the highest priority event is placed first, and the lowest priority event is placed last. It can be appreciated that any sorting algorithm suitable for ordering items based on priority or order is applicable to principles herein. Non-limiting examples of sorting algorithms include bubble sort, quicksort, shell sort, merge sort and bucket sort. In one embodiment, merge sort is perceived to be particularly efficient since the radio events are usually generated in a sorted order within each of the radio event lists 174, 176, 178. Since the sorted list 228 is in chronological order, radio events that are placed first are loaded first into the TCU 150, so that they can be executed first by the TCU 150. Where there are two or more events of equal priority, the sequence of these events may be arbitrarily determined. For example, one way of sequencing events of the same priority is according to the radio device. In other words, a radio event for a first radio will be sequenced before another radio event of equal priority for a second radio. The sorted list 228 is sent to the optimizer module 182.

Figure 16:
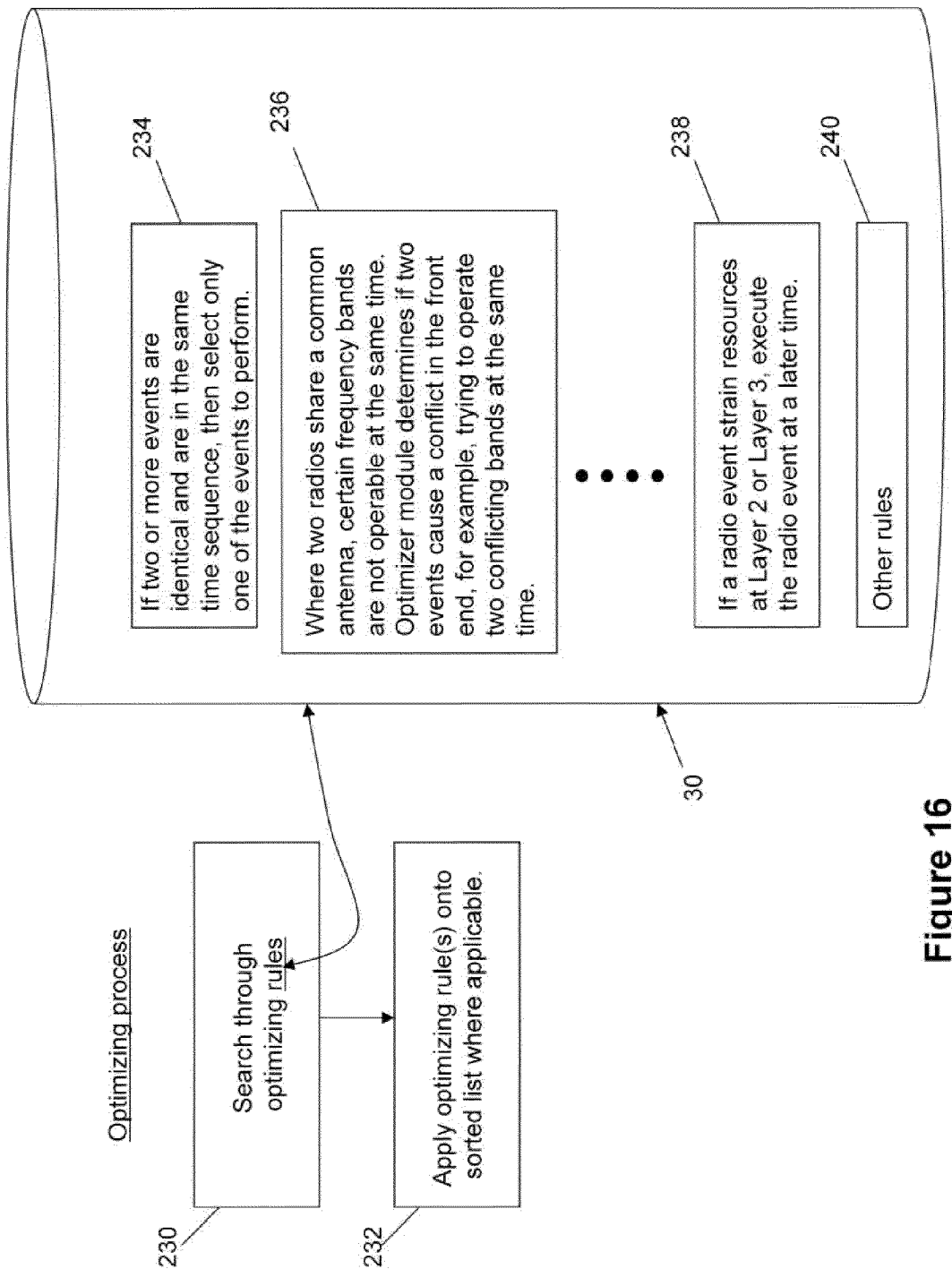
FIG. 16 is a flow diagram of the optimizing process carried out by the optimizing module in FIG. 11.

Turning to FIG. 16, the optimizer module 182 applies a number of optimization rules 30 to the sorted list 228. First, at block 230, the optimizer module 182 searches through the optimization rules 30 to determine which of the rules 30 apply to the radio events in the sorted list 228. At block 232, if the radio events in the sorted list 228 meet the conditions set forth in the rules 30, then action is taken by the optimizer module 182 to execute or apply the applicable rule or rules 30.

One rule 234 is that if two or more events in a time sequence are identical, then only one of the events are selected and the other events are removed from the sorted list. In other words, redundant events are removed from the list.

Other optimization rules are related to the front end module 172. In another rule 236, if there are two events that cause a hardware component, for example a low noise amplifier or antenna, to operate at different frequencies at the same time, thereby causing a conflict, then the optimizer module 182 can re-sequence the two events so that they are not in conflict with one another. Re-sequencing the events, or changing the order and timing of the events, avoids the conflict. In other words, this rule 236 optimizes the sequencing of radio events by avoiding instructions that can lead to conflicts or errors caused by the interaction between two or more radios.

The optimizer module 182 may also apply other rules 240 in relation to the constraints of the upper layers, for example Layer 2 (data link layer) and Layer 3 (network layer). For example, as per rule 238, if a radio event or TCU instruction were to strain the resources at Layer 2 or Layer 3 during a given time period, then that radio event or TCU instruction is delayed and executed at a different time. The optimizer module 182 also measures aspects of the radio events (e.g. frequency of different types radio events, total time that a receiver or transmitter is active, and delays). These collected measurements can be used in combination with other measured aspects of the mobile device to optimize efficiency, speed, and power usage. For example the time periods at which the mobile device's battery is being drained can be correlated with the activity periods of the radio to determine if there is a relationship that can be optimized.

Turning back to FIG. 11, the sorted and optimized rules are then sent to the loader module 184 so that the radio events, starting with the highest priority event, can be loaded into the FIFO buffer 164 in the TCU 150. It can be appreciated that the sorted and optimized radio event list contains a combination of radio events for two or more radio devices in the mobile device 10.

It can be appreciated that each radio event can comprise a number of TCU instructions. The TCU instructions are the lower level constituents that form a radio event. In one embodiment, after the radio events have been sorted and optimized, then the loader module 184 decomposes each radio event into a set of one or more TCU instructions, as per block 186. These TCU instructions maintain their sequence to reflect the ordering of the sorted and optimized radio events list. It can therefore be understood that the loader module 184 specifically loads the TCU instructions into the FIFO buffer 164. In this way, the TCU 150 processes the TCU instructions to implement the radio events according to the sorted and optimized event list.

Figure 17:
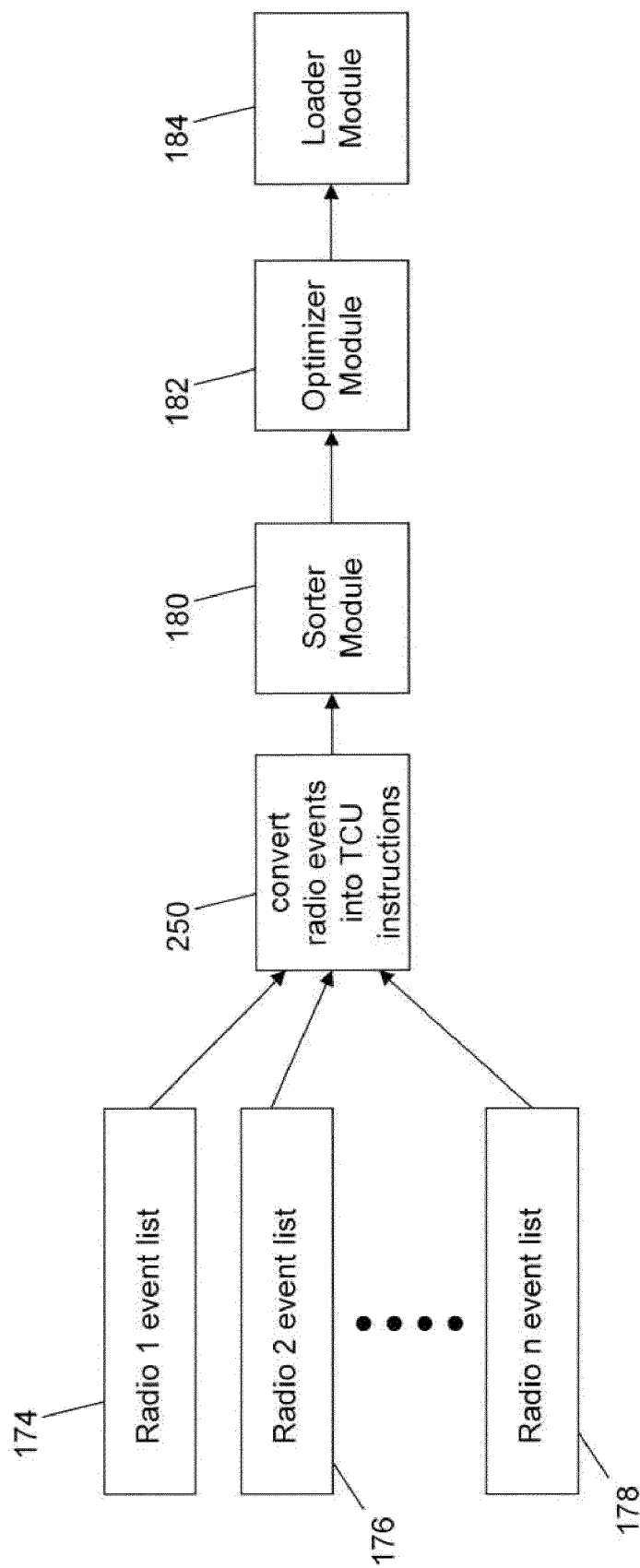
FIG. 17 is a block diagram of the components of another embodiment of the radio sequencing module shown in FIG. 4.

Turning to FIG. 17, in another embodiment, instead of each radio having a list of corresponding radio events, each radio has a list of corresponding TCU instructions. In other words, on the onset, the list is decomposed into lower level detail comprising TCU instructions, as per block 250. Examples of TCU instructions are those that control the processor sleep mode entry for power savings and system clock calibrations. Similar to the sequencing process described above, each of these TCU instructions is assigned to a certain priority level. The mapping between a certain TCU instruction and a certain priority level is established in the firmware by the programmer. The sorter module 180 sorts the TCU instructions for the two or more radio devices within a given time sequence. The TCU instructions are sorted according to priority, where the highest priority TCU instructions are placed first in the sorted list. The sorted list of TCU instructions are then optimized according to the optimization rules. The TCU instructions are then sent to the loader module 184. Since the sorted and optimized list already comprises TCU instructions, further decomposition into TCU instructions is not needed. Thus, the list of TCU instructions are sent to the FIFO buffer 164 for execution by the TCU 150.

Figure 18:
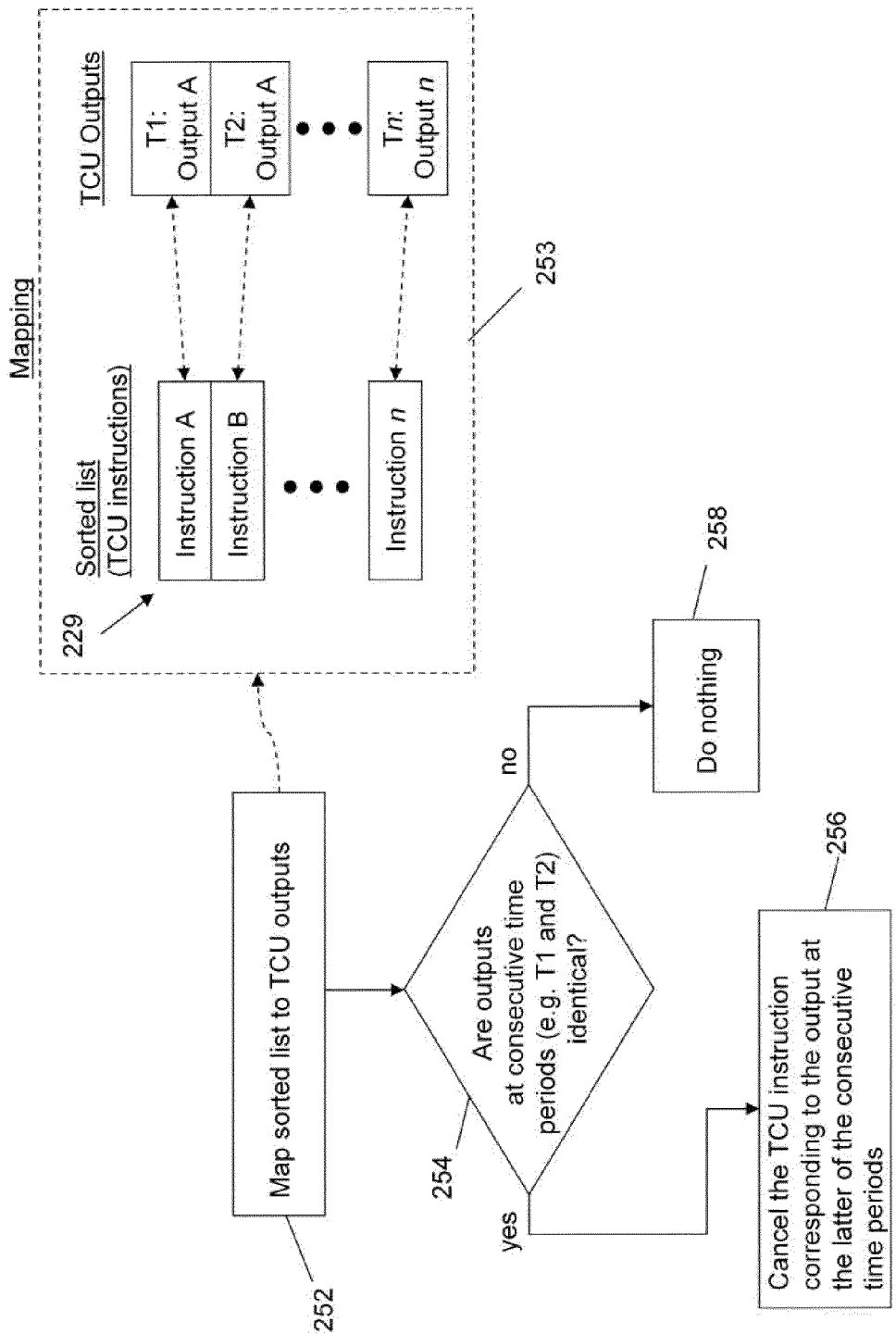
FIG. 18 is a flow diagram of an optimization rule specific to a sorted list of TCU instructions.

In one embodiment, where the radio events are converted to TCU instructions at block 250, there is an additional optimization rule that is specific to TCU instructions. Turning to FIG. 18, since the TCU instructions are lower level, in block 242 the optimizer module 182 maps the TCU instructions (e.g. denoted Instruction A and Instruction B) to the TCU outputs (e.g. denoted Output A). The mapping 243 shows that each of the TCU instructions in the sorted TCU instructions list 229 is mapped to a corresponding output to be executed at a given time period. At block 244, if the outputs at consecutive time periods (e.g. denoted 'T1' and 'T2') are identical, then at block 246, the optimizer module 182 cancels at least one of the TCU instructions corresponding to the redundant outputs. Preferably, the optimizer module 182 cancels the TCU instruction corresponding to the TCU output at the latter of the consecutive time periods. If there are no consecutive TCU outputs that are identical, then the optimizer module 182 does nothing, as per block 258. In the example shown, since Output A at T2 is redundant to Output A at T1, therefore, the optimizer module 182 cancels Instruction B, which corresponds to Output A at T2. In this way, TCU instructions leading to redundant TCU outputs are removed to reduce the processing load on the TCU 150 and front end module 172.

In another embodiment, the assignment of priority to the radio events or TCU instructions, or both are carried out dynamically. In other words, a radio event or TCU instruction is assigned a priority during the operation of the mobile device 10 depending on certain conditions. For example, based on the available resources of the front end module 172 at the time a radio event is listed, the radio event is assigned a priority that is appropriate with the available resources. In other words, if there are few available resources, then radio events that require less resources are assigned a high priority since they can be executed with the few available resources in a timely manner.

As noted above, the optimization process is optional. It can therefore be understood that a sorted list of radio events or TCU instructions can be sent from the sorter module 180 directly to the loader module 184.

Figure 20:
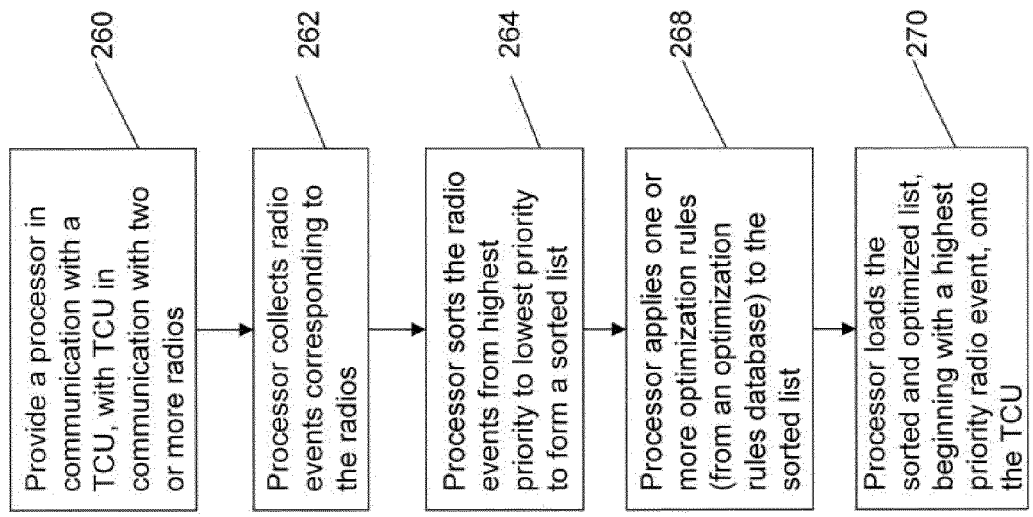
FIG. 20 is a flow diagram of another embodiment of a radio sequencing process.
Figure 19:
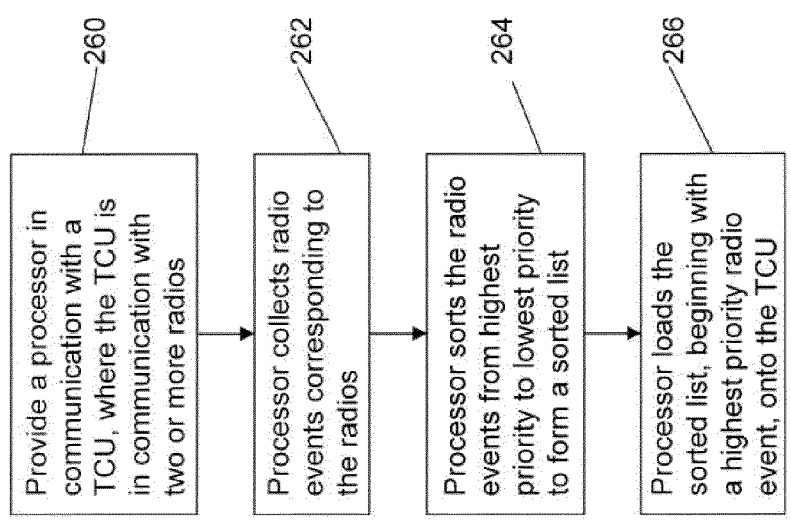
FIG. 19 is a flow diagram of a radio sequencing process.

FIG. 19 and FIG. 20 show different embodiments of the sequencing process. In FIG. 19, at block 260, a processor 102 in communication with a TCU 150 is provided, whereby the TCU 150 is in communication with two or more radios. At block 262, the processor 102 collects radio events corresponding to the radios. At block 264, the processor 102 then sorts the collected radio events from highest priority to lowest priority in order to form a sorted list 128. The processor 102 then loads the sorted list 128, beginning with the highest priority radio event, onto the TCU 150.

Similarly in FIG. 20, blocks 260, 262 and 264 are implemented. After block 264, at block 268, the processor 102 applies one or more optimization rules from an optimization rules database 30, to the sorted list 128. The processor 102 then loads the sorted and optimized list, beginning with the highest priority radio event, onto the TCU 150, as per block 270. It can thus be appreciated that block 264 is optional.

The sequencing algorithm described herein advantageously allows for a mobile device 10 to manage radio events or TCU instructions, or both, for two or more radios. It also allows mobile devices 10 with a single TCU 150 to manage the radio events or TCU instructions, or both, where the TCU 150 is configured to execute a single stream of radio events or TCU instructions. In other words, a single TCU 150 in combination with this sequencing method is sufficient to manage radio events or TCU instructions for multiple radios in a mobile device 10.

The sequencing algorithm, through the sorter module 180, also advantageously manages the radio events or TCU instructions, or both, in a way to ensure that urgent or time-sensitive radio events or instructions are processed first, regardless of which one of the radios the radio event or TCU instruction is directed towards. Thus, a higher priority event of a first radio is not processed after a lower priority event of a second radio, simply because the radio event list of the second radio is processed first.

During the sequencing process, the optimizer module 182 also addresses the interactions of radio events or TCU instructions between the two or more radios, which in some cases share hardware and software resources. The optimizer module 182 advantageously recognizes such interactions and coordinates the radio events or TCU instructions from the two or more radios to reduce processing load on radios. This also decreases the processing time in a mobile device 10 adapted for multi downlink multi carrier technology. The coordination or optimization rules may also avoid conflicts given the available hardware capabilities of the mobile device 10.

Although the above has been described with reference to certain specific embodiments, various modifications thereof will be apparent to those skilled in the art without departing from the scope of the claims appended hereto.

The invention claimed is:

1. A method of sequencing radio events in a mobile device, said mobile device adapted for a Downlink Dual Carrier (DLDC), said mobile device comprising a processor, a single timing control unit (TCU) and two or more radio devices, each of said radio devices comprising a receiver, said two or more radio devices enabling said mobile device to simultaneously receive data on two or more different frequency channels, said TCU interfacing between said processor and said two or more radio devices, each of said radio events comprises one or more executable instructions for said TCU and whereby said TCU is configured to execute said radio events one at a time to generate one or more commands to control at least one of said two or more radio devices, said method comprising:
   said processor collecting said radio events corresponding to said two or more radio devices;
   said processor sorting said radio events from highest priority to lowest priority to form a sorted list;
   said processor optimizing said sorted list, forming an optimized sorted list, using one or more rules that are stored in an optimization rules database;
   said processor loading said optimized sorted list, beginning with a highest priority radio event, onto said TCU; and
   wherein said radio events are grouped into one or more time sequences, and said optimization rules database contains a rule that if two or more radio events are identical and are in a given time sequence, then only one of said identical radio events is selected for execution.

2. The method according to claim 1 wherein said optimization rules database contains a rule that if two radio events cause a hardware component in said mobile device to operate at different frequencies at the same time, then said processor re-sequences said two events so they are not in conflict with each other.

3. The method according to claim 1 wherein each of said two or more radio devices has a corresponding radio event list, and said corresponding radio events lists are collected by said processor.

4. The method according to claim 1 wherein said radio events include any one of a digital signal processing radio queue command, a strobe, a front end module configuration change, a processor sleep mode entry, and a system clock calibration.

5. The method according to claim 1 wherein said processor decomposes said one or more radio events on said sorted list into one or more TCU instructions, said sorted list of said one or more TCU instructions loaded onto said TCU.

6. The method according to claim 1 wherein said one or more radio events are sorted from highest priority to lowest priority using any one of bubble sort, quicksort, shell sort, merge sort and bucket sort.

7. The method according to claim 1 wherein a priority is statically assigned to each of said one or more radio events on the onset.

8. The method according to claim 7 wherein a radio event from said one or more radio events is assigned a low priority if said radio event is not directly dependent on network timing; said radio event is assigned a medium priority if said radio event can be delayed by several clock cycles; and said radio event is assigned a high priority if said radio event should happen first in a given time period.

9. The method according to claim 1 wherein a priority is dynamically assigned to each of said one or more radio events based on the availability of resources in said mobile device's front end module.

10. The method according to claim 1 wherein said one or more radio events are decomposed into TCU instructions before sorting said one or more radio events.

11. The method in claim 1 occurring on Layer 1 of a networking model.

12. A computer readable medium comprising computer executable instructions that when executed by said processor at said mobile device perform the method according to claim 1.

13. A mobile device configured to sequence radio events, said mobile device adapted for a Downlink Dual Carrier (DLDC), said mobile device comprising a processor, a single timing control unit (TCU) and two or more radio devices, each of said radio devices comprising a receiver, said two or more radio devices enabling said mobile devices enabling said mobile device to simultaneously receive data on two or more radio devices enabling said mobile device to simultaneously receive data on two or more different frequency channels, said TCU interfacing between said processor and said two or more radio devices, each of said radio events comprises one or more executable instructions for said TCU and whereby said TCU is configured to execute said radio events one at a time to generate one or more commands to control at least one of said two or more radio devices; and wherein:
   said processor is configured to collect said radio events corresponding to said two or more radio devices;
   said processor is configured to sort said radio events from highest priority to lowest priority to form a sorted list;
   said processor is configured to optimize said sorted list, forming an optimized sorted list, using one or more rules that are stored in an optimization rules database;
   said processor is configured to load said optimized sorted list, beginning with a highest priority radio event, onto said TCU; and
   wherein said radio events are grouped into one or more time sequences, and said optimization rules database contains a rule that if two or more radio events are identical and are in a given time sequence, then only one of said identical radio events is selected for execution.

14. The device according to claim 13 wherein said optimization rules database contains a rule that if two radio events cause a hardware component in said mobile device to operate at different frequencies at the same time, then said processor re-sequences said two events so they are not in conflict with each other.

15. The device according to claim 13 wherein each of said two or more radio devices has a corresponding radio event list, and said processor is configured to collect said corresponding radio events lists.

16. The device according to claim 13 wherein said radio events include any one of a digital signal processing radio queue command, a strobe, a front end module configuration change, a processor sleep mode entry, and a system clock calibration.

17. The device according to claim 13 wherein said processor is configured to decompose said one or more radio events on said sorted list into one or more TCU instructions, said sorted list of said one or more TCU instructions loaded onto said TCU.

18. The device according to claim 13 wherein said one or more radio events are sorted from highest priority to lowest priority using any one of bubble sort, quicksort, shell sort, merge sort and bucket sort.

19. The device according to claim 13 wherein a priority is statically assigned to each of said one or more radio events on the onset.

20. The device according to claim 19 wherein a radio event from said one or more radio events is assigned a low priority if said radio event is not directly dependent on network timing; said radio event is assigned a medium priority if said radio event can be delayed by several clock cycles; and said radio event is assigned a high priority if said radio event should happen first in a given time period.

21. The device according to claim 13 wherein a priority is dynamically assigned to each of said one or more radio events based on the availability of resources in said mobile device's front end module.

22. The device according to claim 1 wherein said one or more radio events are decomposed into TCU instructions before sorting said one or more radio events.

* * * * *